United States Patent
Holbrook et al.

(10) Patent No.: US 6,314,871 B1
(45) Date of Patent: Nov. 13, 2001

(54) COOKING APPLIANCE WITH IMPROVED HEAT DISTRIBUTION

(75) Inventors: Richard M. Holbrook, Pasadena; Jeff Busta, La Crescenta; Scott Turner, Valencia; Filiberto Betancourt, North Hills; Karel Slovacek, Irvine; Jeff Lam, El Monte; James Layfield, Fountain Valley, all of CA (US)

(73) Assignee: Thermador Corporation, Los Angeles, CA (US)

( * ) Notice: Subject to any disclaimer, the term of this patent is extended or adjusted under 35 U.S.C. 154(b) by 0 days.

(21) Appl. No.: 09/691,903

(22) Filed: Oct. 19, 2000

Related U.S. Application Data

(62) Division of application No. 09/290,883, filed on Apr. 14, 1999
(60) Provisional application No. 60/081,978, filed on Apr. 16, 1998.

(51) Int. Cl.[7] .................................................. A47J 37/04
(52) U.S. Cl. ................................ 99/401; 99/445; 99/446; 99/447; 99/449; 99/450; 126/41 R
(58) Field of Search ........................... 126/41 R; 239/548, 239/565, 566; 99/400, 401, 396, 385, 445, 446, 447, 449, 450

(56) References Cited

U.S. PATENT DOCUMENTS

| | | |
|---|---|---|
| D. 54,852 | 4/1920 | Kerr et al. . |
| 806,475 | 12/1905 | Koneman . |
| 2,940,381 | 6/1960 | Cottongim et al. . |
| 2,985,097 | 5/1961 | Nevin et al. . |
| 3,593,647 | 7/1971 | Copeland, Jr. . |
| 4,428,281 | 1/1984 | Miller . |
| 4,454,805 | 6/1984 | Matthews . |
| 4,493,308 * | 1/1985 | Hurley et al. ................... 126/41 R |
| 4,727,853 | 3/1988 | Stephen et al. . |
| 4,979,440 | 12/1990 | Latour et al. . |
| 5,062,408 | 11/1991 | Smith et al. . |
| 5,105,725 | 4/1992 | Haglund . |
| 5,237,914 | 8/1993 | Carstensen . |
| 5,345,923 | 9/1994 | Luebke et al. . |
| 5,355,868 | 10/1994 | Haen . |
| 5,368,009 | 11/1994 | Jones . |
| 5,421,319 | 6/1995 | Moore, Jr. et al. . |
| 5,467,691 | 11/1995 | Koziol . |
| 5,473,980 | 12/1995 | Carpenter . |
| 5,481,965 | 1/1996 | Kronman . |
| 5,542,345 | 8/1996 | Gongwer . |
| 5,613,486 | 3/1997 | Johnston . |
| 5,617,778 | 4/1997 | Schroeter et al. . |
| 5,765,469 | 6/1998 | Schlosser et al. . |
| 5,806,412 | 9/1998 | Bedford et al. . |
| 5,873,355 | 2/1999 | Schlosser et al. . |
| 5,878,739 | 3/1999 | Guidry . |
| 5,890,482 * | 4/1999 | Farnsworth et al. ................... 126/39 |
| 5,911,812 | 6/1999 | Stanek et al. . |

* cited by examiner

Primary Examiner—Curtis E Sherrer
Assistant Examiner—Hao Mai
(74) Attorney, Agent, or Firm—Brooks & Kushman P.C.

(57) ABSTRACT

Cooking appliances, cooking assemblies, and cooking assembly components that improve heat distribution are provided. In one embodiment, a cooking assembly has a sear grid including a radiant panel having an undulating shape. The panel defines at least one generally parabolic dome with a radiused peak to allow liquids at the peak to be rapidly heated by the burner. The dome has sides extending away from the peak with a generally increasing slope to cause liquids flowing down the sides of the dome to accelerate. In another embodiment, a double U-shaped burner is provided. A U-shaped burner has a base for positioning at the front of the cooking assembly and a pair of legs that extend toward the rear of the cooking assembly. A second U-shaped connecting tube is positioned to connect the U-shaped burner base to the front of the cooking assembly housing.

10 Claims, 8 Drawing Sheets

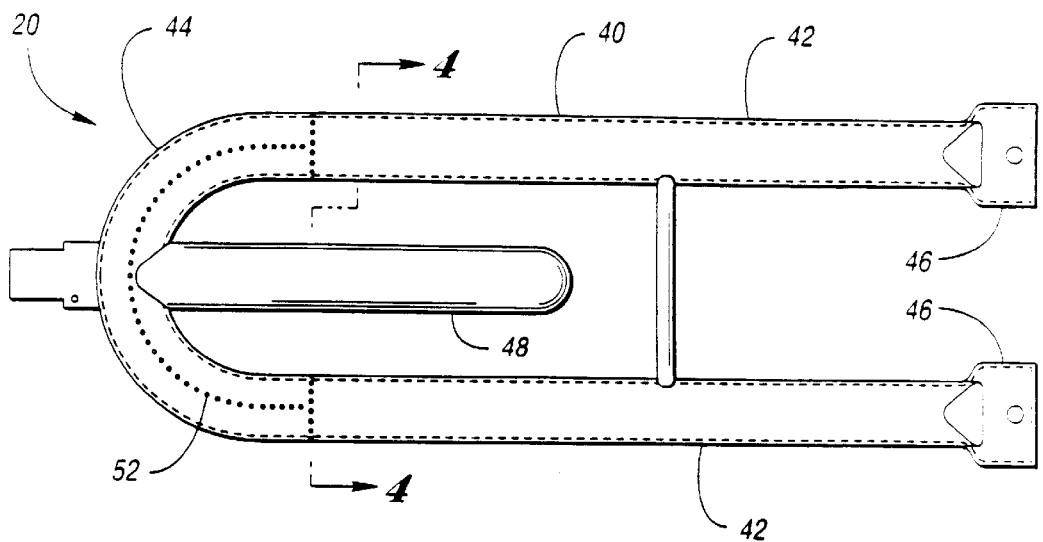
Fig. 2
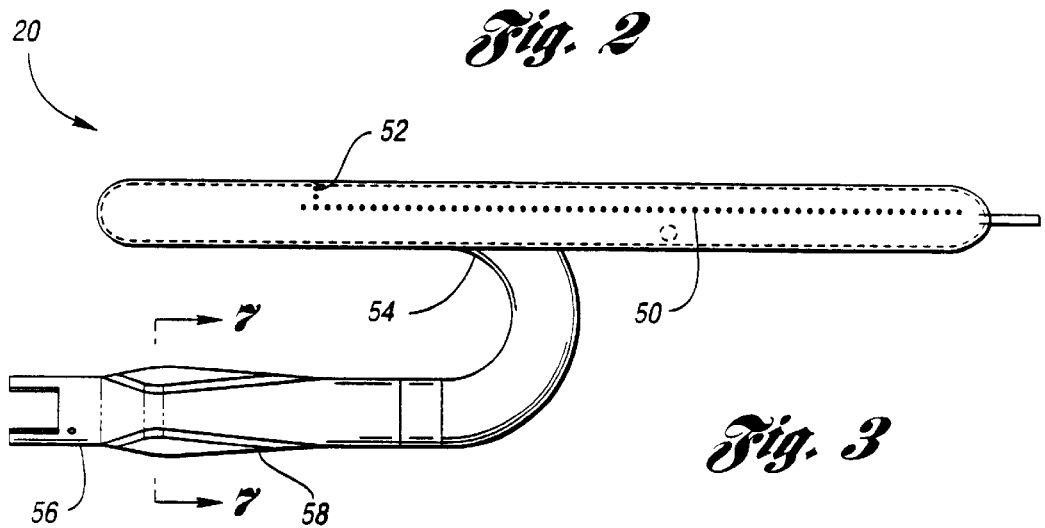
Fig. 3
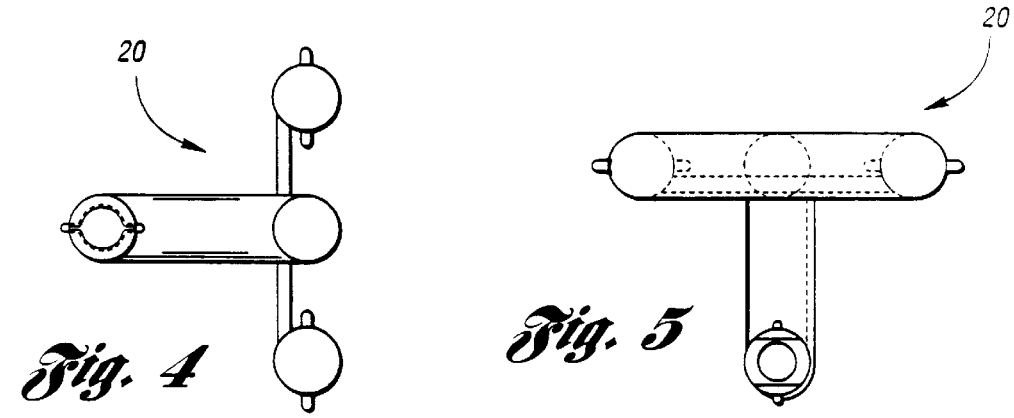
Fig. 4
Fig. 5

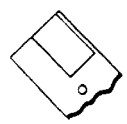
Fig. 6                    Fig. 7
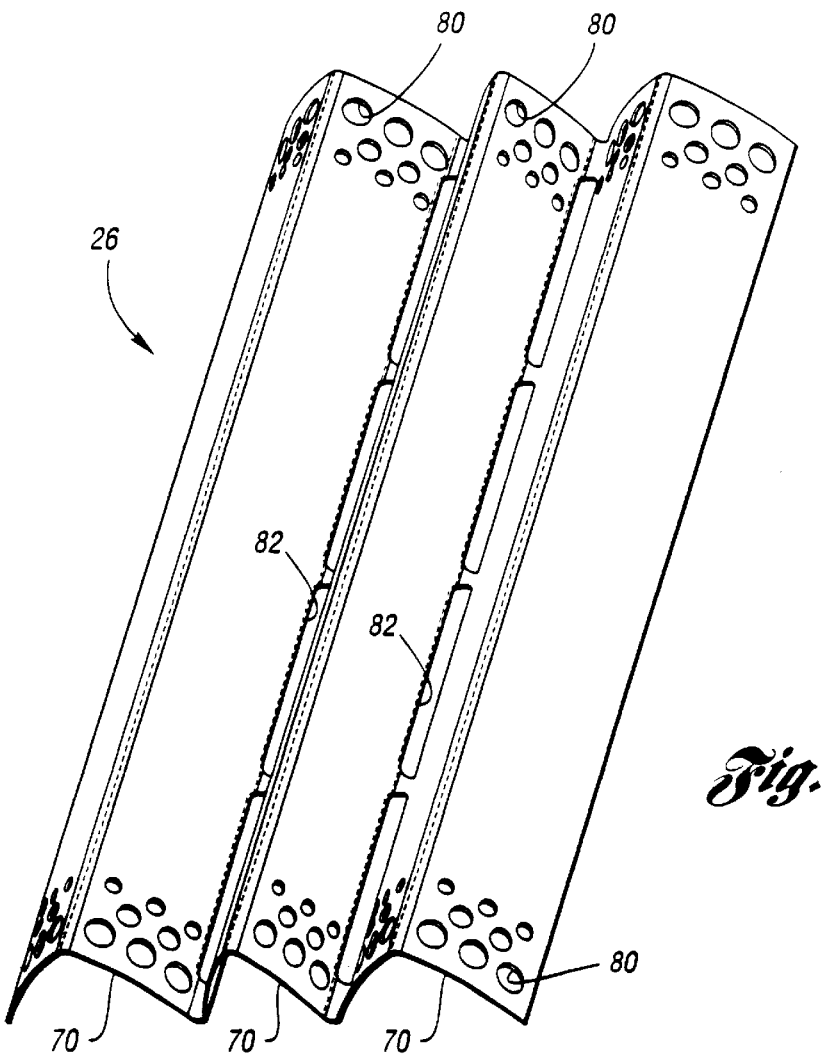
Fig. 8
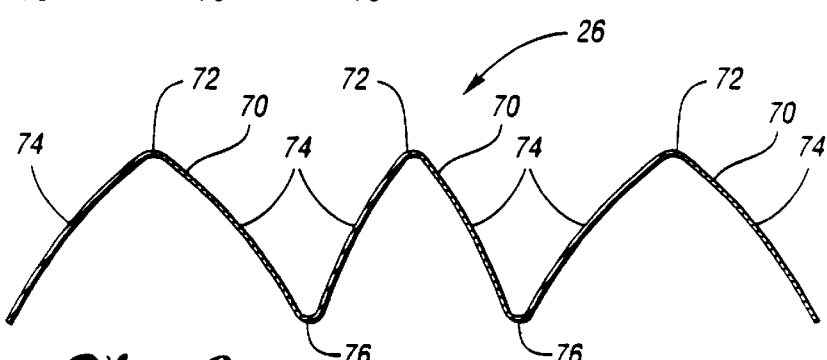
Fig. 9

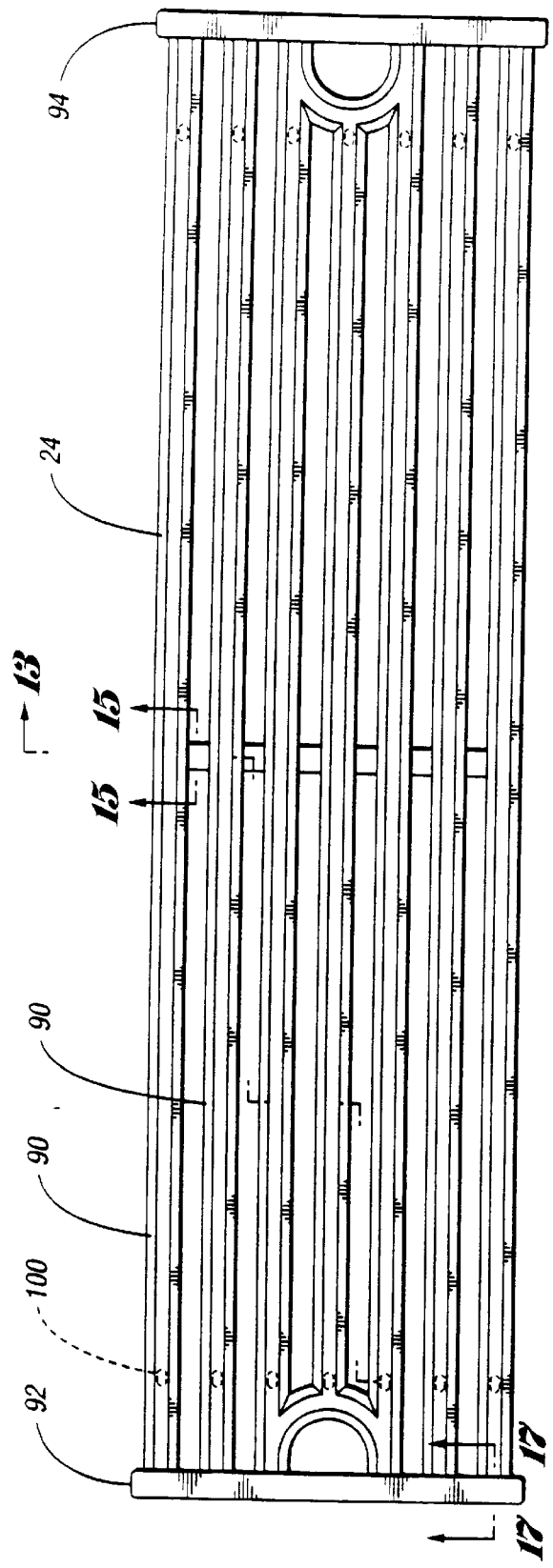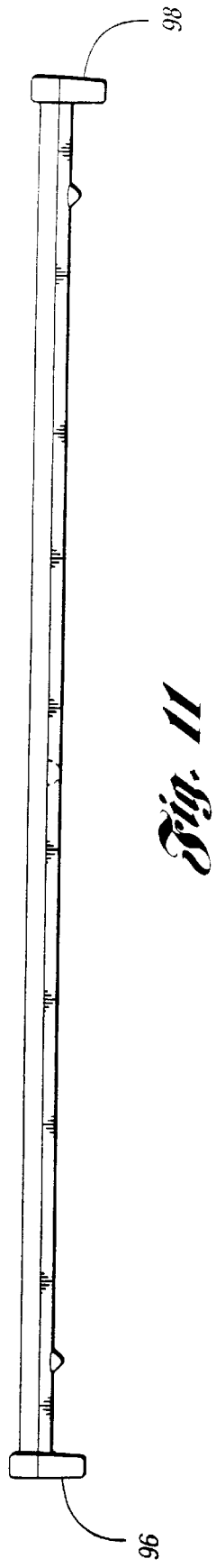

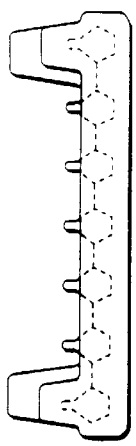
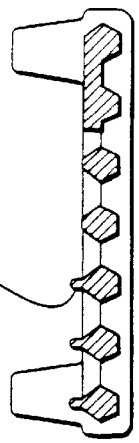
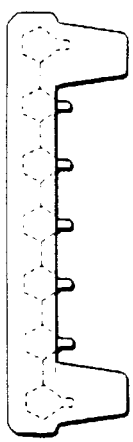
Fig. 12　　　　Fig. 13　　　　Fig. 14
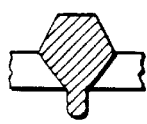
Fig. 15　　　　Fig. 16
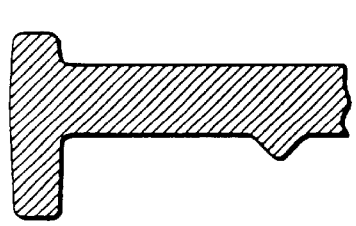
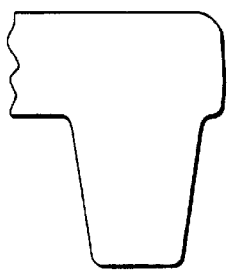
Fig. 17　　　　Fig. 18

US 6,314,871 B1

COOKING APPLIANCE WITH IMPROVED HEAT DISTRIBUTION

CROSS-REFERENCE TO RELATED APPLICATIONS

This application is a divisional of copending application Ser. No. 09/290,883 filed on Apr. 14, 1999 which claims the benefits of U.S. Provisional Application No. 60/081,978, filed on Apr. 16, 1998 and entitled "Barbecue Grill With Improved Heat Radiant And Distribution."

TECHNICAL FIELD

The present invention relates to cooking appliances and cooking assemblies for use in cooking appliances.

BACKGROUND ART

In a cooking appliance, a cooking assembly is mounted within the cooking appliance housing. The cooking assembly typically includes a cooking assembly housing, a burner assembly within the cooking assembly housing, and a cooking grid positioned above the burner assembly for placing food to be cooked thereon.

Some cooking assemblies employ a sear grid between the burner assembly and the cooking grid. In such cooking assemblies, it is desirable to have controlled heat distribution so that a user may have precise control over the cooking process. Many attempts have been made to provide various features on a cooking assembly to provide better control over heat distribution.

Because it is always desirable to provide the best cooking assembly with the best and most controlled heat distribution, there is a need for an improved cooking appliance and cooking assembly that provide more precise control over heat distribution than do existing cooking assemblies.

DISCLOSURE OF INVENTION

It is therefore an object of the present invention to provide an improved cooking assembly for use in a cooking appliance that utilizes one or more improved features to provide more precise control over heat distribution.

In carrying out the above object, a cooking assembly for use in a cooking appliance is provided. The cooking assembly comprises a cooking assembly housing, a burner assembly, a cooking grid, and a sear grid. The burner assembly includes at least one burner extending within the cooking assembly housing. The cooking grid is positioned above at least one burner with respect to the cooking assembly housing. The sear grid includes a radiant panel having an undulating shape. The panel is located between the burner and the cooking grid. The panel defines at least one generally parabolic dome with a radiused peak to allow liquids at the peak to be rapidly heated by at least one burner. Further, the generally parabolic dome has sides extending away from the peak. The sides have a generally increasing slope as the sides extend away from the peak to cause liquids flowing down the sides of the dome to accelerate.

Preferably, the radiant panel has a first end and a second end with the dome extending from the first end to the second end. Further, the panel preferably defines a plurality of apertures through the sides of the dome to promote convection heating. Further, preferably, the plurality of apertures through the sides of the dome are located at at least one of the first and second panel ends. Still further, a preferred radiant panel defines a plurality of generally parabolic domes with a trough defined between each pair of adjacent domes. Further, preferably, each trough defines a plurality of apertures to drain liquids as liquids flow down the sides of the adjacent domes.

In a preferred configuration, the cooking assembly further comprises a deflector plate and a drip pan. The deflector plate is positioned below the sear grid with respect to the cooking assembly housing, and has inclined surfaces arranged to control the flow of liquids that drip past the sear grid. The drip pan is positioned below the deflector plate with respect to the cooking assembly housing for collecting liquids that flow past the deflector plate.

Further, in a preferred embodiment, the cooking assembly housing has a front support and a rear support located above the front support. The cooking grid preferably comprises a cooking grid section with a first end defining at least one first leg of a first length and a second end defining at least one leg of a second length that is longer than the first length. As such, positioning the cooking grid section with at least one first leg on the front support and at least one second leg on the rear support orients the cooking grid section to produce a grilling surface with a forward sloping inclination. Further, positioning the cooking grid section with at least one first leg on the rear support and at least one second leg on the front support orients the cooking grid section to produce a level grilling surface.

Preferably, the cooking grid section has a top surface for grilling and a bottom surface. The bottom surface preferably defines a plurality of drip stop bumps for providing controlled dripping of liquids that pass through the cooking grid section.

Further, in carrying out the present invention, a cooking appliance comprising a housing and a cooking assembly with a sear grid including a radiant panel having an undulating shape is provided. The panel defines at least one generally parabolic dome with a radiused peak, and with sides extending away from the peak. The sides have a generally increasing slope as the sides extend away from the peak.

Preferably, the cooking appliance further includes a side shelf pivotally mounted to the cooking appliance housing. A latch release mechanism is configured for locking the side shelf in an extended position, and for releasing the side shelf to allow pivoting from the extended position to a relaxed position adjacent to the cooking assembly housing.

Still further, in accordance with the present invention, a burner for use in a cooking assembly of a cooking appliance is provided. The burner comprises a U-shaped burner and a U-shaped connecting tube. The U-shaped burner has a base for positioning at the front of the cooking assembly and a pair of legs that extend toward the rear of the cooking assembly. The U-shaped connecting tube is positioned to connect the U-shaped burner base to the front of the cooking assembly housing. Preferably, the U-shaped burner has a plurality of flame ports located along sides of the legs.

The advantages associated with embodiments of the present invention are numerous. For example, a sear grid with a radiant panel that has a dome with a radiused peak and sides with a generally increasing slope allows liquids to vaporize at the peak and otherwise to be rapidly urged toward apertures in the adjacent trough by the increasing slope. Further, a U-shaped burner with a U-shaped connecting tube advantageously allows the gas in a gas grill to enter the burner at a lower temperature while still providing a hot grilling surface at the front of the cooking assembly.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 2 is a top view of a burner of the present invention;

FIG. 3 is a side view of the burner shown in FIG. 2;

FIG. 4 is a cross-sectional view taken along line 4—4 of FIG. 2;

FIG. 5 is an end view of the burner shown in FIGS. 2–4;

FIG. 6 shows the end of the connecting tube on the burner;

FIG. 7 is a cross-sectional view taken along line 7—7 of FIG. 3;

FIG. 8 illustrates a radiant panel of a sear grid for use in cooking assemblies in accordance with a preferred embodiment of the present invention;

FIG. 9 is a cross-sectional view of the radiant panel shown in FIG. 8;

FIG. 10 is a top view of a cooking grid section for use in cooking assemblies of the present invention;

FIG. 11 is a side view of the cooking grid section of FIG. 10;

FIG. 12 is an end view of the cooking grid section of FIG. 10;

FIG. 13 is a cross-sectional view taken along line 13—13 of FIG. 10;

FIG. 14 is a view of the other end of the cooking grid section shown in FIG. 10;

FIG. 15 is a cross-sectional view taken along line 15—15 of FIG. 10;

FIG. 16 is an enlarged view showing the stop bumps on the bottom surface of the cooking grid section;

FIG. 17 is a cross-sectional view taken along line 17—17 of FIG. 10;

FIG. 18 is an enlarged view showing the longer leg on the bottom of the cooking grid section;

BEST MODES FOR CARRYING OUT THE INVENTION

Figure 1:
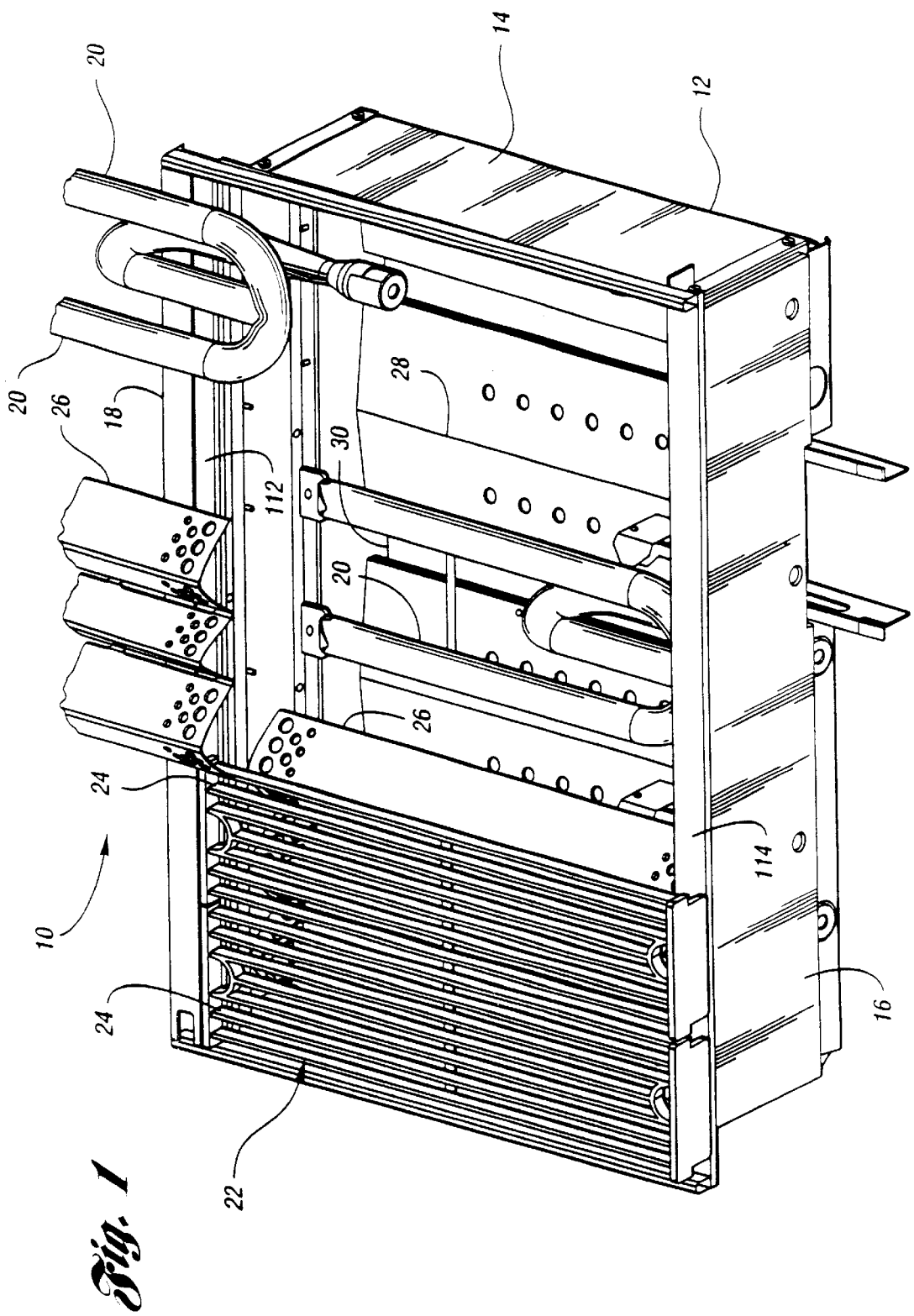
FIG. 1 illustrates a cooking assembly of the present invention having both the radiant panel features and the double U-shaped burners.

With reference to FIG. 1, a cooking assembly for use in a cooking appliance is generally indicated at 10. Cooking assembly 10 is preferably employed in a barbecue grill, however, it is to be appreciated that some features of the present invention may be employed in other cooking appliances. For example, the double U-shaped burners may be employed in a variety of cooking appliances in addition to gas grills. As illustrated, cooking assembly 10 includes a cooking assembly housing 12 having a front 16, a back 18, and sides 14. A burner assembly includes a plurality of burners 20. As shown, in a preferred embodiment of the present invention, the cooking assembly employs three burners, and a cooking grid 22 composed of six cooking grid sections 24. Further, the preferred embodiment includes a sear grid composed of three radiant panels 26. Of course, it is to be appreciated that the number of burners, cooking grid sections, and radiant panels may vary based on the particular cooking appliance, and that the preferred embodiment shown in FIG. 1 may be modified to create other suitable cooking appliance configurations.

Cooking assembly 10 further includes a plurality of deflector plates 28 positioned below the sear grid, but above a drip pan 30 for collecting the liquids flowing past the deflector plate.

With reference to FIGS. 3–7, a burner of the present invention, which is utilized in preferred embodiments of cooking assemblies of the present invention, is generally indicated at 20. Burner 20 includes a U-shaped burner 40 with a pair of legs 42 and a base 44. Base 44 is preferably positioned at the front of the cooking assembly, with the pair of legs extending toward the rear of the cooking assembly, as shown in FIG. 1. Burner 20 is mounted at its back end at portions 46. A second U-shaped connecting tube 48 is positioned to connect the U-shaped burner base 44 to the front of the cooking assembly housing. In preferred embodiments of the present invention, a plurality of flame ports 50 are located along sides of legs 42. Further, a plurality of flame ports 52 are located along the top of burner tube 40. As shown, a gas inlet 56 is located at a venturi 58.

With reference now to FIGS. 8 and 9, a radiant panel of the present invention for use in a sear grid of the cooking assembly is generally indicated at 26. The radiant panel has an undulating shape. When positioned in the cooking assembly, the panel is located between the burner and the cooking grid as depicted in FIG. 1. Radiant panel 26 defines at least one generally parabolic dome 70. In preferred embodiments of the present invention, a plurality of parabolic domes are defined by each radiant panel. Parabolic dome 70 has a radiused peak 72 to allow liquids at the peak to be rapidly heated by the burner, which is located beneath the radiant panel. Each dome has sides 74 extending away from peak 72. Sides 74 have a generally increasing slope as sides 74 extend away from peak 72 to cause liquids flowing down sides 74 of dome 70 to accelerate.

In preferred embodiments wherein the radiant panel includes a plurality of generally parabolic domes, panel 26 further defines a trough 76 between each pair of adjacent domes 70. Further, it is preferred that a plurality of apertures 80 are formed in sides 74 of dome 70 to promote convection. It is further preferred that the apertures 80 are located at one and preferably both ends of each dome 70. Still further, it is preferred that each trough 76 defines a plurality of apertures 82 to drain liquids as liquids flow down sides 74 of adjacent domes 70.

With reference now to FIGS. 10–18, and primarily to FIGS. 10–12, a cooking grid section for use in preferred cooking assemblies of the present invention is indicated at reference numeral 24. Cooking grid section 24 includes a plurality of elongate members 90 forming a grill. Cooking grid section 24 has a first end 92 and a second end 94. First end 92 defines at least one first leg 96 of a first length. Preferably, two legs 96 are defined at opposite sides of the end of cooking grid section 24, of course, alternatively, a single elongate leg may be provided. Second end 94 of cooking grid section 24 defines at least one, and preferably a pair, of second legs 98. Second leg 98 is longer than first leg 96. Accordingly, it is preferred that the cooking assembly housing has front and rear supports for receiving the cooking grid section legs. Further, it is preferred that the rear support (112, FIG. 1) on the cooking assembly housing be located above the front support (114, FIG. 1) to allow greater versatility for the cooking grid section. That is, placing the longer legs on the higher support orients the cooking grid section to produce a grilling surface with a sloping inclination. It is preferred that the rear support is the higher support such that the sloping inclination is a forward sloping inclination. Further, it is preferred that the leg lengths and support positions be arranged such that reversing the orientation of the cooking grid section to place the shorter leg on the higher support and the longer leg on the lower support orients the cooking grid section to produce a level grilling surface.

As best shown in FIGS. 13, 16, and 17, cooking grid section 24 preferably defines a plurality of drip stop bumps 100 on the bottom surface of the grid section.

Figure 19:
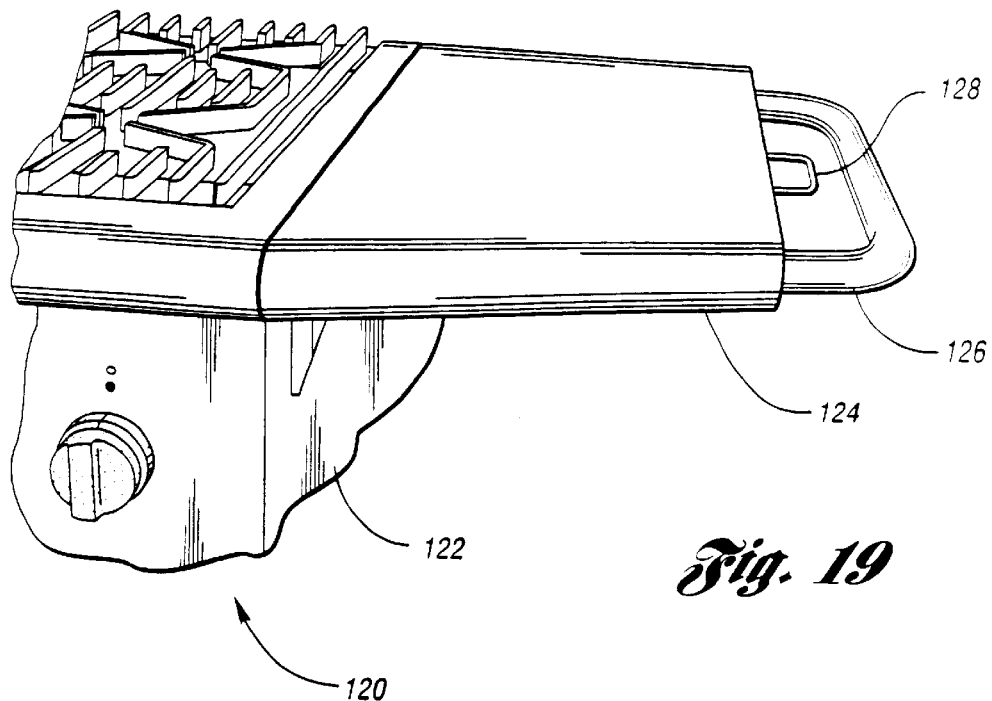
FIG. 19 is a cooking appliance of the present invention, showing the pivotal side shelf and latch release mechanism.
Figure 20:
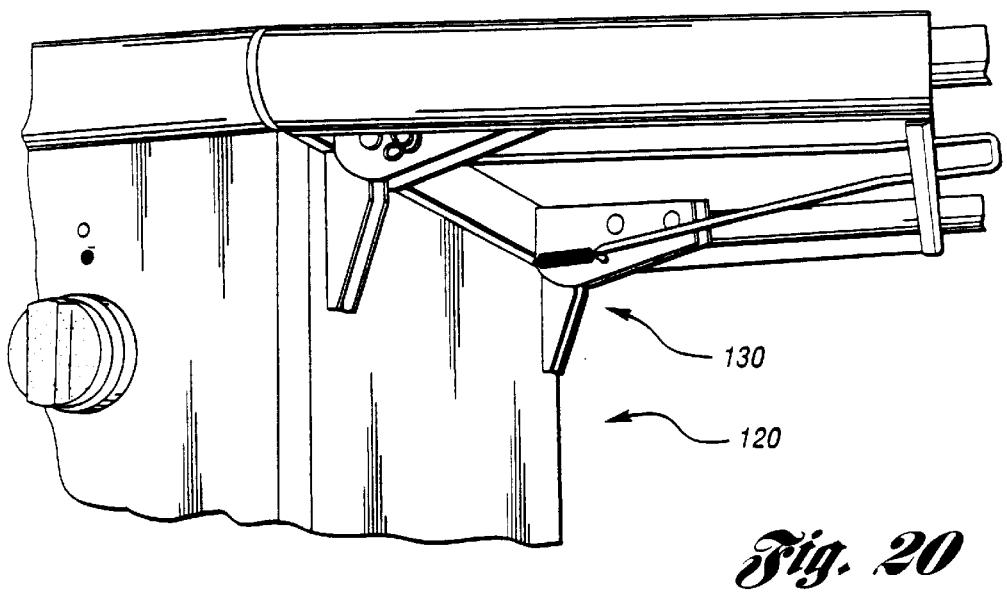
FIG. 20 is a view of the cooking appliance shown in FIG. 19, looking from below the side shelf to better illustrate the latch release mechanism.

With reference now to FIG. 19, a cooking assembly of the present invention is generally indicated at 120. Cooking appliance 120 has a side 122 with a side shelf 124 pivotally mounted thereto. Side shelf 124 includes a handle 126, and a latch release mechanism 128. In FIG. 20, the latch release mechanism is generally indicated at 130.

Figure 21:
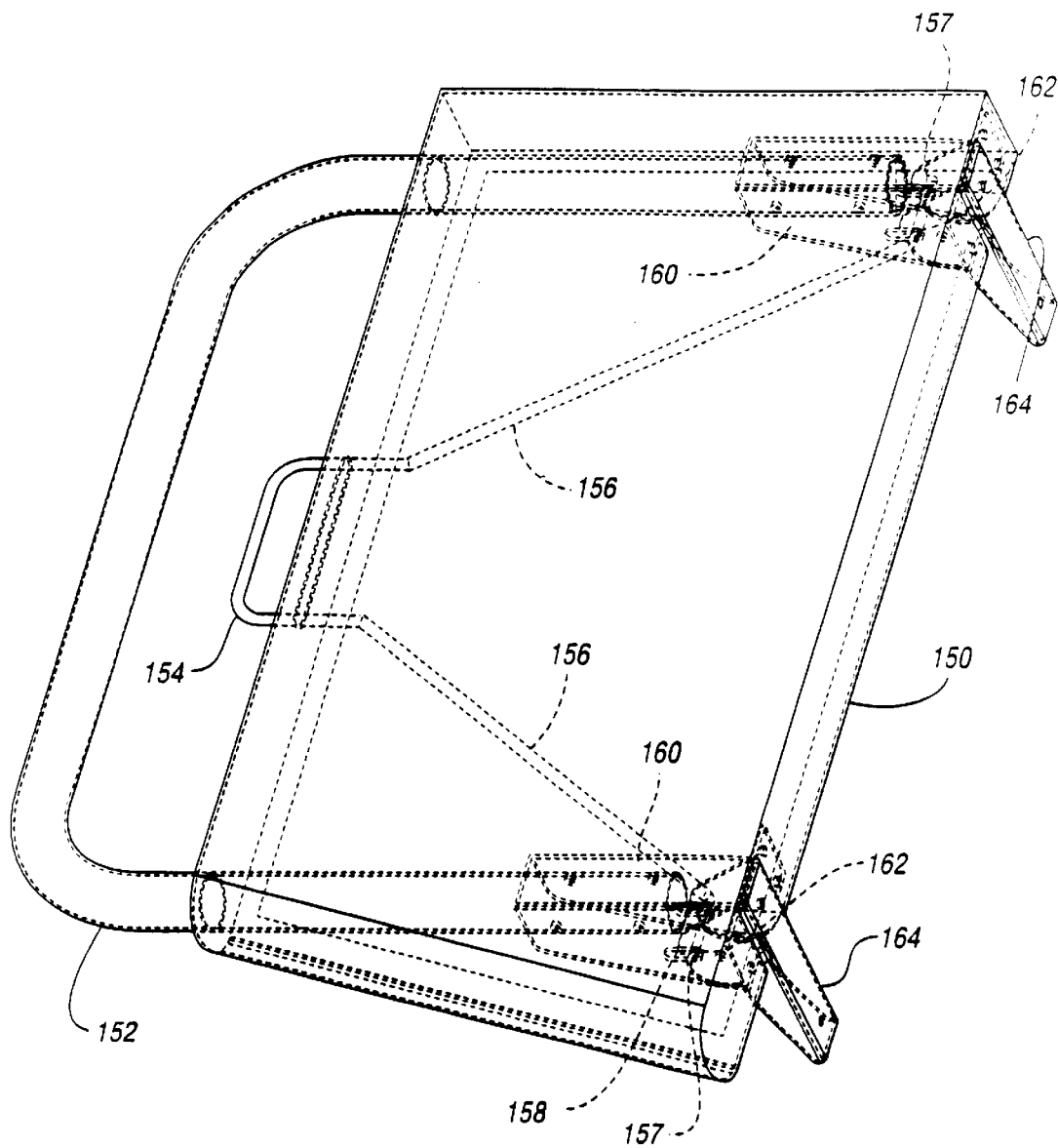
FIG. 21 is a view of a side shelf and latch release mechanism of the present invention shown detached from the cooking appliance to better illustrate operation of the latch release mechanism.

With reference to FIG. 21, a side shelf and latch release mechanism of the present invention is illustrated in greater detail, to show the preferred configuration of the latch release mechanism. Side shelf 150 includes handle 152, and latch release mechanism handle 154. When an operator pulls handle 154 toward handle 152, arms 156 are pulled to disengage ends 157 of arms 156 from notches 162 in brackets 164. Thereafter, ends 157 may slide along the arcuate surface on brackets 164 to position the side shelf in a relaxed position against the side of the cooking assembly. Then, when desired, handle 152 may be lifted to place the side shelf in the extended position and then handle 154 may be urged to push pins 157 along slots 158 into the notches 162 along the arcuate surface on brackets 164. The latch release mechanism may be configured such that handle 154 is unbiased or may alternatively be configured such that a spring or other device biases handle 154 to help retain pins 157 within notches 162 to provide a more secure locking of the latch release mechanism.

Figure 22:
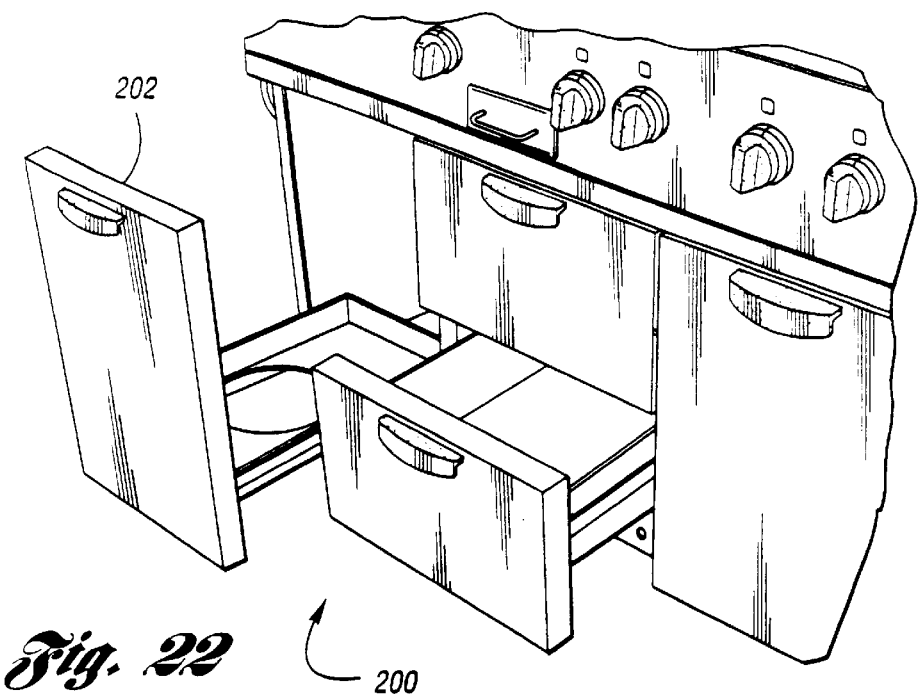
FIG. 22 is a cooking appliance of the present invention, showing additional features at the front of the cooking appliance.
Figure 23:
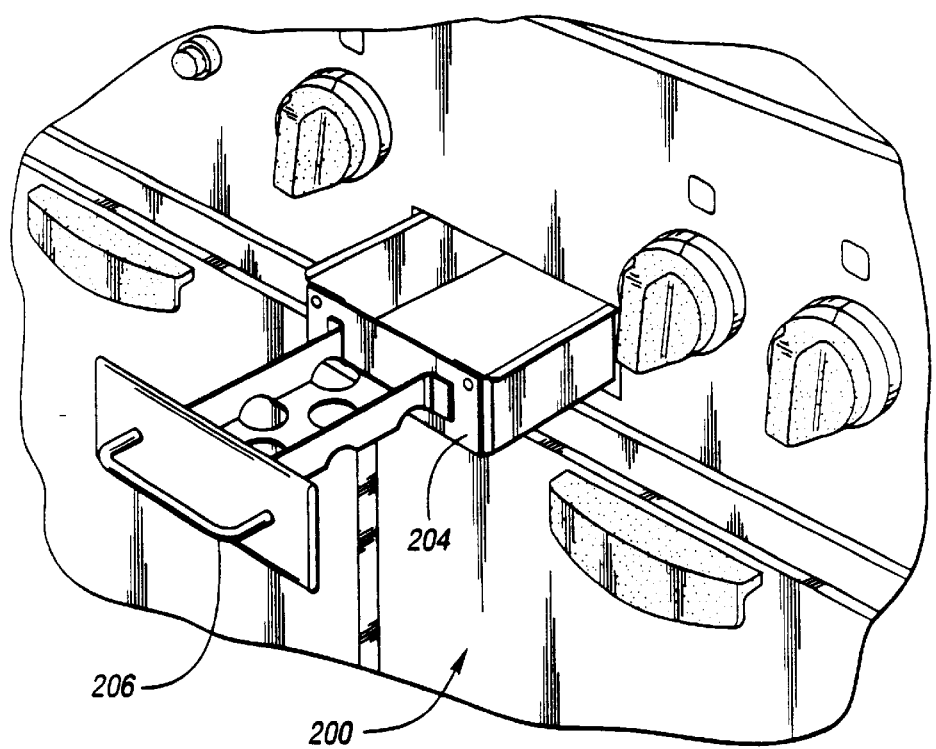
FIG. 23 is another front view of a cooking appliance of the present invention, showing a smoker tray.

With reference now to FIG. 22, yet another cooking assembly of the present invention is generally indicated at 200. FIG. 22 shows a front view of a cooking assembly, showing additional features such as drawers 202. Further, FIG. 23 shows a closer view of the front of cooking appliance 200, showing a smoker tray 204 with handle 206. Wood chips and the like may be placed within smoker tray 204 to add flavor to the food on the grill.

Although embodiments of the present invention have many advantages in both gas grilling barbecues and in other cooking assemblies, it is to be appreciated that some features of the present invention are particularly advantageous in a gas grilling barbecue. As such, an additional description of preferred embodiments of the present invention and the advantages thereof is given below.

The present invention is an improved barbecue grill having a cooking engine assembly that provides numerous improvements, preferably in a gas fuel source barbecue grill.

Improved efficiency in heat generation is provided by U-shaped burners with flame ports on the inside, on the outside, and on the top of the burner tubes, at various locations, that spreads the heat source to provide more evenly distributed heat output within the grill. In addition, the burners include a second U-shaped connecting tube, preferably joined to a port on the front wall of the grill below the position of the first U-shaped burner tubes with ports, and also joined to the first U-shaped member. This structure provides a cooler gas/air mixture input to the burners for more efficiency. The grill also improves the utilization of energy supplied by the fuel, and thus increases the heat output per/BTU input.

A more even heat distribution is also contributed to by the heated radiant panel. The distributor or radiant panel preferably comprises one or more panels of undulating shape, preferably with domes formed by parabolically rounded curves. A plurality of domes formed by the parabolic curves are coupled together by troughs, in a preferred radiant panel shape. The troughs are preferably apertured to control drainage of juices emanating from food cooked on a grid plate supported above the radiant panel. The generally parabolic shape of each of the dome walls provides a blunted, radiused peak at which the juices remain exposed to heat transfer for an extended period for vaporization of the juices. Preferably, flame ports are positioned at the lowest portions of the radiant so that rising heat converges at the peak of the dome where the blunted surface area maintains contact for heat transmission that evaporates most juices, grease, and fats. Nevertheless, the dome surface drops at a steeper angle below the peak of the dome where the trough can collect and drain the unevaporated juices along controlled paths without combustion to reduce flare-up.

The heating distribution control is also provided by a plurality of apertures through the sides of the radiant panel walls, preferably positioned adjacent the ends of the dome-forming panels adjacent the walls of the cooking chamber. The various sizes and shapes of the apertures, as well as the positions and the patterns of the apertures, control heat circulation throughout the chamber. Preferably, each radiant panel is supported by studs protruding from the end walls of the cooking chamber. The studs, in the preferred embodiment, are spaced apart for receipt within two of the peaks in each panel, registering with studs supported on an opposite wall of the grill housing, to stably support the panels in the grill between the cooking grid and the burners in the cooking chamber. A deflector plate below each burner has inclined surfaces to control and cool the flow of cooking juices to the drip pan supported on the bottom of the cooking chamber. As a result, flare-ups of unburned fats and greases are reduced over previously known cooking grills with sear bars, ceramic briquettes and the like, while improving flavor due to searing and juice evaporation, and reducing cooking time with improved heat distribution.

Although burners including an integrated, cast, grease shield may be used, the panels are supported in a position that covers the burners for reducing flareup activity when cooking fatty, greasy foods. Nevertheless, the accelerating slope of the curved side surfaces of the radiant panel causes the fatty liquids and grease to vaporize as they strike and are retained upon the less steeply sloped, curved portion. Preferably, the tangent of the curves at the peak of the dome is greater than 90° to slow removal of the juice away from the peak at which heat energy converges. As any excess liquids which are not vaporized drip downward, the surface becomes more steeply curved causing liquids to drip along controlled paths through the slots and openings at the bottom of troughs formed between adjacent, curved side surfaces of the radiant. As a result, material which may flare up is quickly removed from the cooking zone above the heat radiant panels. Nevertheless, the flavorizing effect in which caramelized sugars from evaporated liquids are transferred through vapor from the radiant heat distributor back onto the surface of the foods being cooked is provided and controlled.

In addition, porcelain-coated cast iron grilling grid segments enhance the grease removing action from the foods placed on the grid. The drip rail shape, preferably with tapering upper and lower side faces on opposite side edges, and preferably with an upper generally hexagonal portion and lower elliptical, radiused faces, and drip stop bumps near one end of the bottom face of the cast iron grill segments add to controlled drainage that reduces flare-up. The grids include legs supporting the grid at an inclination, preferably sloping toward the front of the grill, when installed in the grill chassis and when oriented to be received in a first position. In the preferred embodiment, longer rear legs are supported on a support attached to the rear housing wall. The front legs are shorter. Preferably, the supports are at levels selected so that differences in leg height and in support height permit the grids to also be installed in a reversed orientation, back to front, and provide a level grill surface. In addition, the reversible feature is a preferred option, and numerous other positioning supports for the grates can be employed to mount the grates at inclined or level positions.

In addition, at least one side shelf on the outer housing of the preferred embodiment includes a pivot mounting and a latch release for simple one hand manual operation. The shelf pivots from a position close to the outer housing to a position extending laterally from the housing, preferably, supported by a latch mechanism retaining the shelf in an extended position. The latch is released by a handle on the shelf also forming the latch release actuator.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cooking assembly for use in a cooking appliance, the cooking assembly comprising:
    a cooking assembly housing;
    a burner assembly including at least one burner extending within the cooking assembly housing;
    a cooking grid positioned above the at least one burner with respect to the cooking assembly housing; and
    a sear grid including a radiant panel having an undulating shape, the panel being located between the burner and the cooking grid, and the panel defining at least one dome with a radiused peak to allow liquids at the peak to be rapidly heated by the at least one burner, and with sides extending away from the peak, the sides having an increasing slope as the sides extend away from the peak to cause liquids flowing down the sides of the dome to accelerate wherein the at least one burner includes a U-shaped burner having a base at the front of the cooking assembly and a pair of legs extending toward the rear of the cooking assembly and aligned with the radiant panel dome, and a U-shaped connecting tube positioned to connect the U-shaped burner base to the front of the cooking assembly housing.

2. The cooking assembly of claim 1 wherein the U-shaped burner has a plurality of flame ports located along sides of the legs.

3. A burner for use in a cooking assembly of a cooking appliance, the burner comprising
    a U-shaped burner having a base for positioning at the front of the cooking assembly and a pair of legs that extend toward the rear of the cooking assembly; and
    a U-shaped connecting tube positioned to connect the U-shaped burner base to the front of the cooking assembly housing.

4. The burner of claim 3 wherein the U-shaped burner has a plurality of flame ports located along sides of the legs.

5. A cooking assembly for use in a cooking appliance, the cooking assembly comprising:
    a cooking assembly housing having a front and a rear; and
    a burner assembly including a U-shaped burner extending within the cooking assembly housing, the U-shaped burner having a base at the front of the cooking assembly housing and a pair of legs extending toward the rear of the cooking assembly housing, and a U-shaped connecting tube positioned to connect the U-shaped burner base to the front of the cooking assembly housing.

6. The cooking assembly of claim 5 further comprising:
    a cooking grid positioned above the burner with respect to the cooking assembly housing.

7. The cooking assembly of claim 6 further comprising:
    a sear grid including a radiant panel having an undulating shape, the panel being located between the burner and the cooking grid, and the panel defining at least one dome with a radiused peak to allow liquids at the peak to be rapidly heated by the burner, and with sides extending away from the peak, the sides having an increasing slope as the sides extend away from the peak.

8. The cooking assembly of claim 7 wherein the U-shaped burner has a plurality of flame ports located along sides of the legs.

9. The cooking assembly of claim 8 wherein the U-shaped burner has a plurality of flame ports located along tops of the legs.

10. The cooking assembly of claim 9 wherein the U-shaped burner includes a venturi inlet.

\* \* \* \* \*